(12) United States Patent
Denis et al.

(10) Patent No.: US 8,640,214 B2
(45) Date of Patent: Jan. 28, 2014

(54) KEY DISTRIBUTION FOR UNCONNECTED ONE-TIME PASSWORD TOKENS

(75) Inventors: Jerome Denis, Austin, TX (US); Amol Deshmukh, Austin, TX (US)

(73) Assignee: Gemalto SA, Meudon (FR)

( * ) Notice: Subject to any disclaimer, the term of this patent is extended or adjusted under 35 U.S.C. 154(b) by 499 days.

(21) Appl. No.: 13/042,420

(22) Filed: Mar. 7, 2011

(65) Prior Publication Data

US 2012/0233684 A1 Sep. 13, 2012

(51) Int. Cl.
*G06F 7/04* (2006.01)
*G06F 21/00* (2013.01)
*G06F 15/16* (2006.01)

(52) U.S. Cl.
USPC ............. 726/9; 726/20; 713/182; 713/184; 713/185

(58) Field of Classification Search
None
See application file for complete search history.

(56) References Cited

U.S. PATENT DOCUMENTS

| 7,548,620 | B2 | 6/2009 | Popp | |
|---|---|---|---|---|
| 8,132,243 | B2 * | 3/2012 | Bychkov | 726/9 |
| 2007/0279227 | A1 * | 12/2007 | Juels | 340/572.1 |
| 2011/0099384 | A1 * | 4/2011 | Grange et al. | 713/184 |
| 2011/0258452 | A1 * | 10/2011 | Coulier et al. | 713/171 |

* cited by examiner

*Primary Examiner* — Nathan Flynn
*Assistant Examiner* — Trang Doan
(74) *Attorney, Agent, or Firm* — The Jansson Firm; Pehr B. Jansson

(57) ABSTRACT

A system and method for distributing symmetric keys in a system including an end-user computer operated by an end-user, a service provider server of a service provider having a service provider identifier, and a manufacturer backend server operated by the manufacturer of the OTP token. The manufacturer backend server operates to verify one-time passwords generated by the OTP tokens and upon verifying the authenticity of the OTP token based on the generated passwords, transmitting the symmetric key to a service provider server or an authentication server. Other systems and methods are disclosed.

23 Claims, 12 Drawing Sheets

This figure is intended to illustrate a table of UIDs and KEYS that an SERVICE PROVIDER would maintain. I.e., it is the table that successively becomes populated as end-users register their tokens using the method

| SYMMETRIC KEY TABLE | | | 415 |
|---|---|---|---|
| USERNAME | UID | SYM KEY | COUNTER |
|  |  |  |  |
|  |  |  |  |
|  |  |  |  |
|  |  |  |  |
|  |  |  |  |

| SYMMETRIC KEY TABLE (Backend) | | | | 715 |
|---|---|---|---|---|
| UID | SYM KEY | SERVICE PROVIDER | REG | FED |
| | | | | |
| | | | | |
| | | | | |
| | | | | |

*Fig. 8*

| SERVICE PROVIDER TABLE | 901 |
|---|---|
| SERVICE PROVIDER | URL |
| | |
| | |
| | |
| | |

*Fig. 9*

| SYMMETRIC KEY TABLE (Service Provider) | | | 415' |
|---|---|---|---|
| USERNAME | UID | SYM KEY | COUNTER |
| CLAIRE | GAKT0000031F | 269F3063... AC1 | 34 |
| LIAM | HCKT00000128 | 45F3079B... 501 | 45 |
| JANE DOE | HCKT0000076F | 786AD3A ,,, BE2 | 1234 |
| JULIUS DOE | IFKT0000034F | 76C2D3F ... A54 | 0 |

*Fig. 11*

| SYMMETRIC KEY TABLE (Backend) | | | | 715' |
|---|---|---|---|---|
| UID | SYM KEY | ISSUER | REG? | FED |
| GAKT0000031F | 269F3063... AC1 | ABC Bank | YES | YES |
| GAKT00000320 | 876DE3F ... 127 | | NO | - |
| GAKT00000321 | 765EA2F ... E10 | | NO | - |
| GAKT0000064F | 567E890... 456 | GREYSTONE | YES | NO |

*Fig. 12*

| SERVICE PROVIDER TABLE | | 109' |
|---|---|---|
| ISSUER | URL | |
| ABC Bank | www.abcbank.com | |
| Greystone | www.greystone.com | |
| | | |
| | | |

*Fig. 13*

| SYMMETRIC KEY TABLE (Backend) | | | | | | 715" |
|---|---|---|---|---|---|---|
| UID | SYM KEY | ISSUER | REG? | FED | FED SERV | |
| GAKT0000031F | 269F3063...AC1 | ABC Bank | YES | YES | fedserv1.com | |
| GAKT00000320 | 876DE3F...127 | ABC Bank | YES | YES | fedserv1.com | |
| GAKT00000321 | 765EA2F...E10 | GREYSTONE | YES | YES | GREYSTONE.com | |
| GAKT0000064F | 567E890...456 | GREYSTONE | YES | YES | GREYSTONE.com | |

| SYMMETRIC KEY TABLE (Federation Services Provider) | | | | 415" |
|---|---|---|---|---|
| USERNAME | UID | SYM KEY | COUNTER | |
| CLAIRE | GAKT0000031F | 269F3063...AC1 | 34 | |
| SLIM | GAKT00000320 | 876DE3F...127 | 48 | |

*Fig. 16*

KEY DISTRIBUTION FOR UNCONNECTED ONE-TIME PASSWORD TOKENS

BACKGROUND OF THE INVENTION

The present invention relates generally to one-time passwords (OTP), and more particularly to distribution of OTP token keys for unconnected OTP tokens.

A one-time password is used to improve the security of an online transaction or to strengthen the user authentication by averting replay attacks because the one-time password is valid for only one use and often only for a limited period of time. OTPs may be generated using various mechanisms including using mathematical algorithms based on a sequence (e.g., based on the value of a counter) or time (e.g., time-synchronized OTP tokens in which the current time is used to generate the password).

One-time password generators are used to generate one-time passwords. One common form of a one-time password generator is a key fob in a form-factor similar to the token illustrated in FIG. 2 (wherein one side of the token is illustrated in FIG. 2A and the opposite side of the token is illustrated in FIG. 2B). In the case of such tokens, a user presses a small button to trigger the generation of the next OTP. The user then uses the newly generated OTP to authenticate with another device or program, such as a web service, for example. When the relying party, e.g., the web service, receives the OTP it confirms the OTP with an authentication server that may confirm or invalidate the OTP as generated by the token in possession of the user.

Both sequence-based OTP algorithms and time-synchronized OTP algorithms use a symmetric secret key to generate an OTP, a key which is known to both the OTP generator and the OTP authentication server. For example, a sequence-based OTP may be generated using a function of the form OTP=f(n, k) where n is the sequence number and k is the secret key associated with the OTP generator, e.g., the particular OTP token. A time-based OTP algorithm may have the form OTP=f(time, k) where time is e.g., the UNIX-time expressed in half-minute, and k is the secret key.

In the case of an unconnected, OTP token, e.g., a key fob, the symmetric key associated with the token is stored in a secure, inaccessible manner in the token. For the authentication algorithm to work, i.e., for the authentication server being presented with an OTP from a particular token, the authentication server must also have the symmetric key so that it can independently calculate the OTP and thereby verify the correctness of the presented OTP. Therefore, one issue in OTP-based security is the distribution of the symmetric keys to the authentication servers.

Traditionally, OTP tokens are issued in large lots assigned to particular web services. For example, an OTP token manufacturer may produce one lot of tokens for ABC bank and another lot for Greystone Enterprises. These companies may then issue the tokens to their customers. The companies may be referred to as token issuers. The manufacturer would supply the secret key associated with each token in the lot directly to the issuers, for example, in a file supplied on a CD-ROM or some other secure form of distribution. Thus, each issuer would possess the secret symmetric keys associated with the tokens it issues and would therefore be able to verify the OTP passwords presented to it.

While the aforementioned process works well for large deployments (1,000 and larger), the process is more problematic for smaller roll-outs as managing the concurrent, secure distribution of the tokens and their respective secret keys imposes significant constraints on packaging and fulfillment processes. For instance, to propose a web-based distribution process through an e-commerce site, a micro-site needs to be created for each customer along with its dedicated inventory of tokens to ensure that the keys are sent to the issuer of the token. This means that the manufacturer must associate particular tokens with particular e-commerce sites and must securely distribute the key file to the corresponding issuer. That may require a manufacturer to set aside an inventory of tokens dedicated to each particular issuer.

A further limitation of the aforementioned process is that it provides no mechanism by which an end-user may purchase an individual OTP token from an independent third party, e.g., a retail outlet, for use with an issuer that is not pre-assigned to a token. While an e-commerce site may wish to provide its users with the capability of using OTP tokens for enhanced security, the e-commerce site may wish to be able to direct its customers to obtain the OTP tokens from an independent third party so that it does not need to be involved in the process of providing tokens to end-users. However, the current mechanism for providing the symmetric key associated with OTP tokens does not allow for such deployments.

A further drawback to the aforementioned key distribution process is that there are several potential risks. The key file must be correctly distributed to the issuer or the issuer may not have the symmetric key available when an end-user seeks to register a token. A failure of the process to deliver the symmetric key file to the issuer would render registration of a token impossible.

As OTPs rely on symmetric encryption technology, the keys should be distributed securely. This requirement puts significant constraints on the inventory management, as one needs to be able to reconstruct the exact list of token IDs shipped to the issuer in order to prepare, encrypt and transmit the key information to the issuer. The problem is particularly vexing when dealing with small size customers or for the renewal of large customers as the overhead to execute these tasks remains ostensibly the same for much smaller revenue.

From the foregoing it is apparent that there is a need for an improved method to provide distribution of keys associated with unconnected OTP tokens in a manner that allows for small deployments of OTP tokens and delivery of OTP tokens via third parties such as retailers.

BRIEF DESCRIPTION OF THE DRAWINGS

FIG. 2 is a close up view of one type of an unconnected one-time password token as may be used in the system of FIG. 1 wherein FIG. 2A illustrates the front of the unconnected one-time password token and FIG. 2B illustrates the back of the same token.

FIG. 8 is an illustration of the Symmetric Key table held by the manufacturer backend server to link unique identifiers for OTP tokens produced by the backend, their corresponding key values, service provider servers to which the OTP tokens are linked, whether the token has been registered, and whether such service providers operate in a federated mode.

FIG. 9 is an illustration of the Service Provider table held by the manufacturer backend server of the manufacturer to link service provider identifiers to contact information of the service provider, e.g., url.

FIGS. 11, 12, and 13 are populated database tables for the Key Table at the service provider server, the Key table at the manufacturer backend server, and the service provider table at the manufacturer server, respectively, after issuance of several OTP tokens through the process of FIG. 10.

FIG. 16 is a database schema illustrating modifications to several tables to allow for hub-based federation.

DETAILED DESCRIPTION OF THE INVENTION

Figure 1:
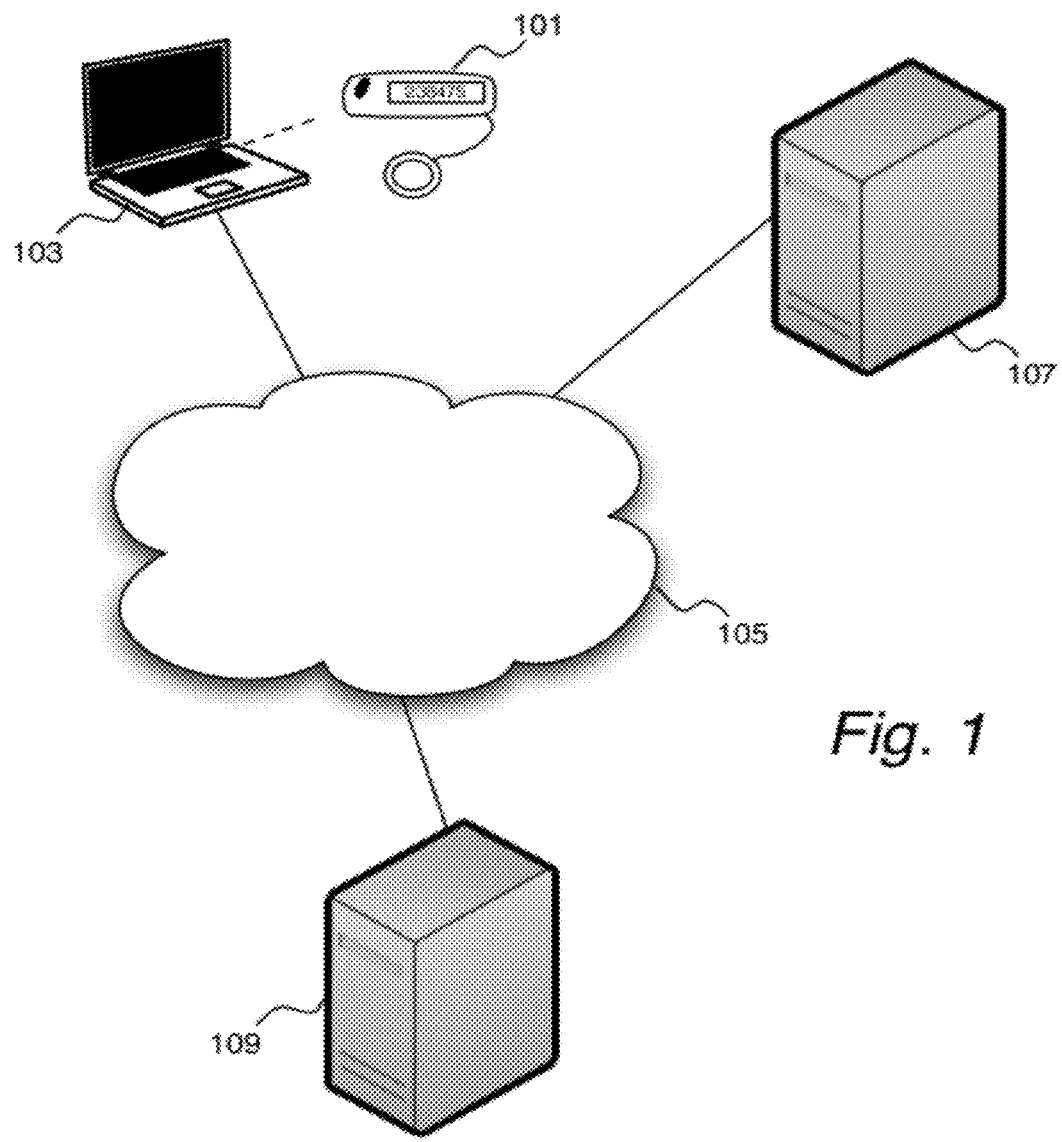
FIG. 1 is a block diagram illustrating a network in which an unconnected one-time password token may be deployed by a service provider that is not directly associated with the manufacturer of the token.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

As shown in the drawings for purposes of illustration, a symmetric-key-distribution process and system is described herein for distributing keys used in one-time-password generation and verification from a backend server to a service provider so that the service provider may register unconnected OTP tokens for use. The described technology provides an elegant and powerful mechanism whereby OTP symmetric keys may be distributed on the initiative of an end user. The technology provides a mechanism by which unconnected OTP tokens may be distributed via third parties such as retailers and activated for use on an ad hoc basis. This mechanism allows for the commoditization of unconnected OTP tokens because with the activation mechanism described herein, tokens may be distributed without regard to which service provider(s) they will be used.

Figure 2:
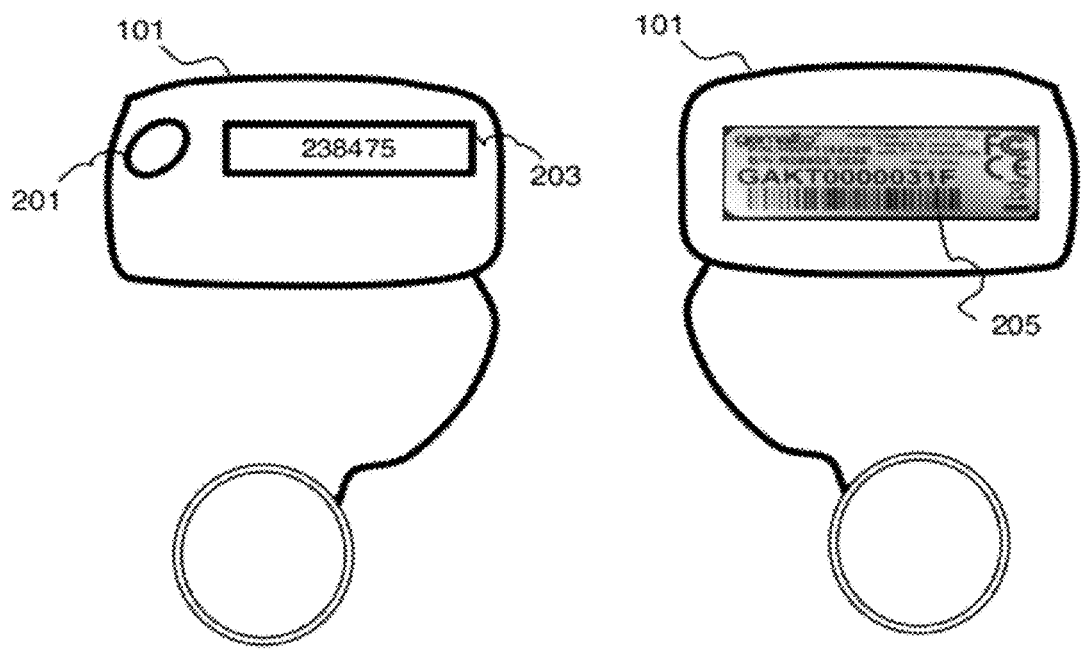

FIG. 1 is a block diagram illustrating a network in which an unconnected one-time password token may be deployed through a service provider that is not directly associated with the manufacturer of the token. An unconnected OTP token 101, associated with an end-user (not shown), may be used by the end-user using the end-user's computer 103 to authenticate with a web service executing over the Internet 105 on a service provider server 107. The OTP token 101, illustrated in FIG. 2 (which is a close up view of one type of an unconnected one-time password token as may be used in the system of FIG. 1 wherein FIG. 2A illustrates the front of the unconnected token), has a button 201 which the end-user may press to trigger the generation of an OTP which is displayed on a display 203. The OTP token has a unique identifier (UID) which is printed on a label 205, for example, on the back of the token 101 as shown in FIG. 2B. In the case of the example illustrated in FIG. 2B, the UID is GAKT0000031F. Thus, the displayed OTP may be associated with a particular token through that token's UID.

The web service, operating on the service provider computer 105, may require the end-user to enter an OTP in order to be authenticated by the web service. The service provider operates (or connects to) an authentication service that executes an OTP algorithm that is congruous to the OTP algorithm used to generate the OTP on the OTP token. Via the UID, which may be linked to a particular user via, for example, a username of the user, the authentication server may independently determine the OTP and thereby verify whether the user has entered the expected OTP.

Figure 3:
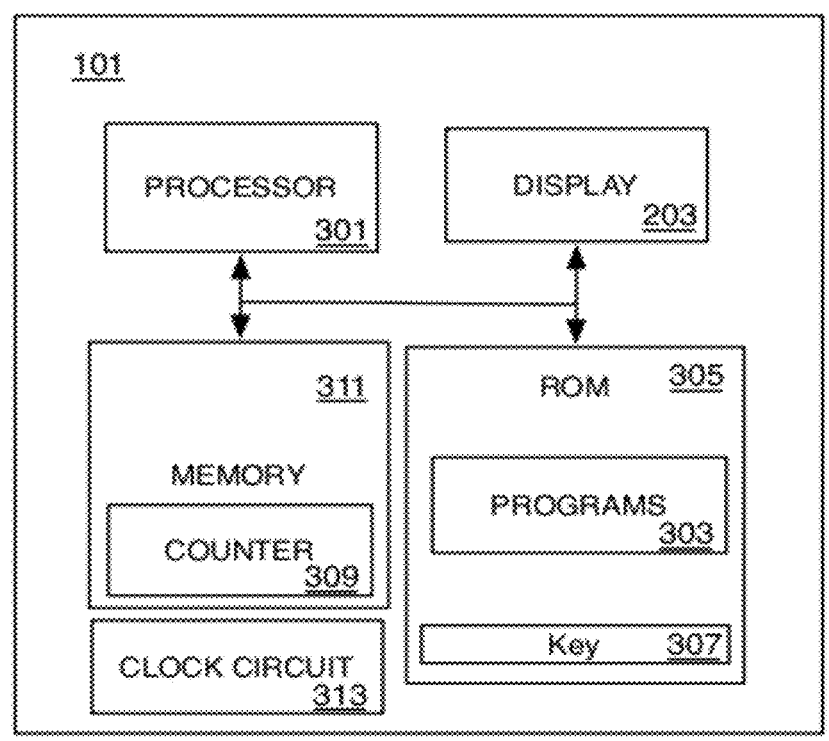
FIG. 3 is a block diagram illustrating a high-level view of an example architecture of the unconnected one-time password token of FIGS. 1 and 2.

FIG. 3 is a block diagram illustrating a high-level view of an example architecture of an unconnected one-time password token 101 of FIGS. 1 and 2. As described above, the token 101 has a button 201 (or other triggering mechanism) for directing a processor 301 to compute an OTP for display on the display 203. The processor 301 operates under instructions of programs 303 stored in, for example, a ROM 305. These programs 303 include an OTP generation algorithm which uses an event and a symmetric key 307 to calculate the OTP to be displayed on the display 203, i.e., the OTP is calculated from a function of the form OTP=f(event, key). The symmetric key 307 is stored in the ROM 305. The event used for the OTP generation algorithm may be a counter 309 stored in memory 311 or the current time, for example, UNIX time half-minute, calculated by a clock circuit 313. If the OTP algorithm used is time-synchronized, the clock circuit 313 is used and the counter is not necessary. Conversely, if the counter is used, a clock circuit is not necessary and the OTP generation instructions would include instructions to cause the processor 301 to increment or decrement the counter.

Figure 4:
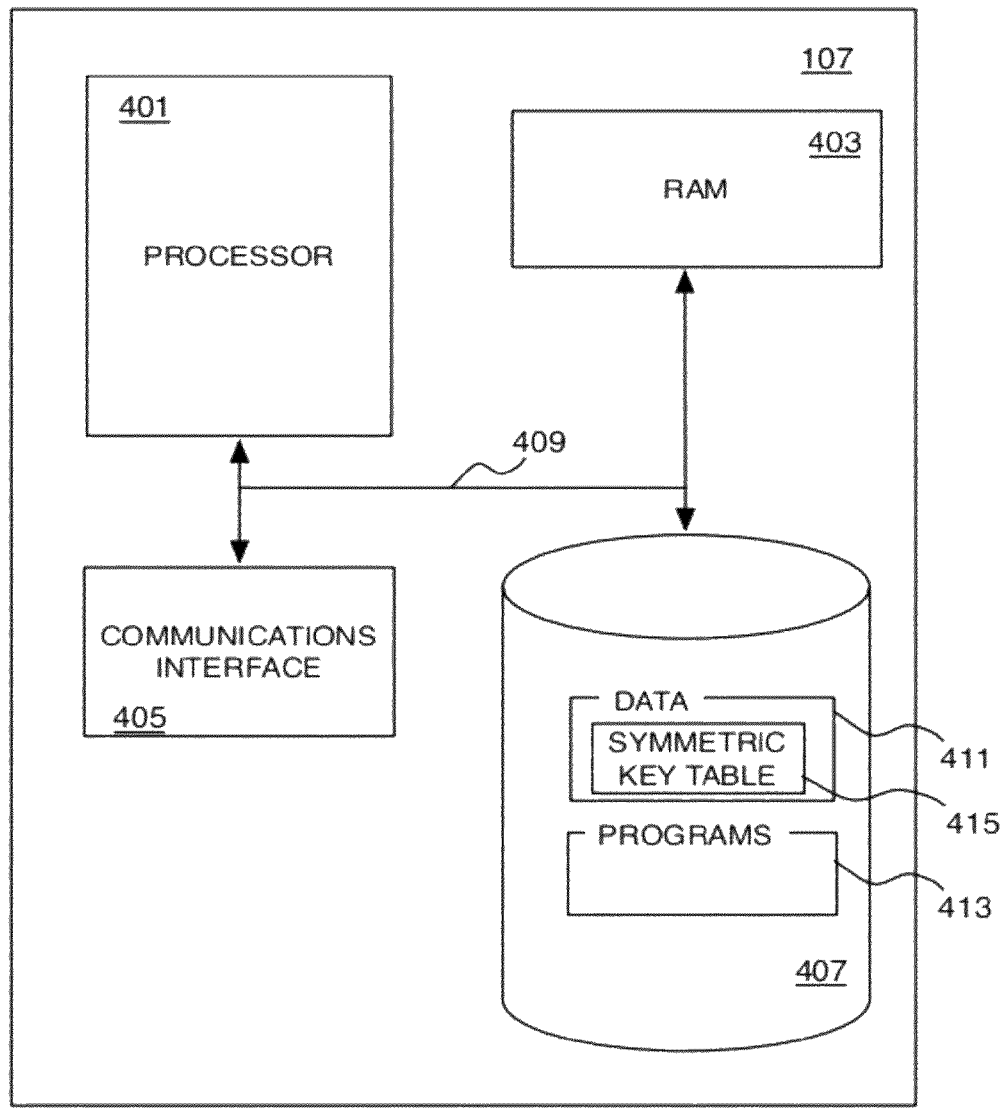
FIG. 4 is a block diagram illustrating a high-level view of an example architecture of a service provider server.

FIG. 4 is a block diagram illustrating a high-level view of an example architecture of a service provider server 107. The service provider server 107, may be any standard configuration computer capable of acting as a web server. As such, in a typical, or exemplary, architecture, the service provider server 107 may contain a central processing unit 401, a random access memory 403, a communications interface 405, and a secondary storage 407 for storing programs 411 and data 413. These units, and other components not illustrated here, may be connected with a bus 409 for communication of instructions and data between the units. The secondary storage 407 may be loaded with programs 411 that are used to provide instructions to the processor to cause the processor to carryout the functions of the service provider server described herein. The secondary storage 407 also contains data used and manipulated by the service provider server pertinent to the execution of the functions of the service provider server described herein. Such data includes a Symmetric-Key table 415, described in greater detail in conjunction with FIG. 5.

Figures 5, 6:
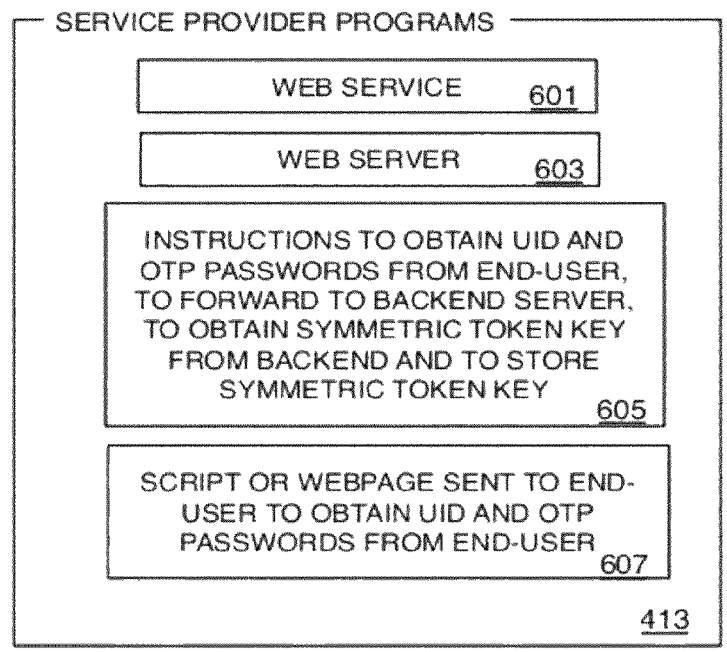
FIG. 5 is an illustration of the Symmetric Key table held by the service provider to link user names, unique identifiers (UID) for OTP tokens registered with the service provider and their corresponding key values as well as the counter used to calculate an OTP.
FIG. 6 is a block diagram illustrating several computer programs of the service provider server and which when executed by the service provider server cause the service provider server to operate as a web server and register OTP tokens according to the technology described herein.

FIG. 5 is an illustration of the Symmetric Key table 415 held by the service provider server 107 to link user names, unique identifiers for OTP tokens registered with the service provider and their corresponding key values as well as the counter used to calculate an OTP. As the service provider 107 registers OTP tokens for use to authenticate a user, the user's username (Username) and the unique identifier (UID) of the token are stored in the Symmetric Key table 415. As is discussed in greater detail herein below, the service provider 107 interacts with the manufacturer backend server 109 to obtain the symmetric key used to calculate OTP passwords. The symmetric key for a particular token 101 is known by the manufacturer backend server 109. Once the manufacturer backend server 109 has verified (as discussed herein below) the OTP token 101, service provider server 107 is provided with the symmetric key of the OTP token 101. Going forward, the service provider server 107 may use the symmetric key stored in the Symmetric Key table 415 to verify OTPs transmitted to it from the end-user's computer 103.

OTPs are calculated from the symmetric key in combination with an event. In one form the event is a count, i.e., the count increases each time an OTP is calculated. Thus, in a counter-based embodiment, the OTP 101 contains a counter 309 and a corresponding counter is stored in the Symmetric Key table 415 counter field. Each time the OTP 101 and the service provider server 107 calculates an OTP, the counter is incremented.

In another embodiment, the event is time. Both the OTP 101 and the service provider server 107 determine a time increment from some fixed point in time, e.g., UNIX time. Thus, the event may be the UNIX time in terms of half-minutes. In that embodiment, there is no need for the counter field in the Symmetric Key table 415 and no need for the counter storage element 309 in the OTP token 101.

The service provider server 107 secondary storage 407 also contains computer program storage 413 for storing programs with instructions to control the operations of the processor 401. FIG. 6 is a block diagram illustrating some programs of the service provider server 107 that issues the OTP token 101 and operable to impart functionality to the service provider server 107. As the service provider server 107 is used to provide some form of web service, e.g., a banking function, e-commerce, or (as described herein below) federated authentication services (which may be provided ancillary to other web services), the programs include a web service program 601. The web service program 601 typically is executed by a web server program 603, e.g., the Apache web server from the Apache Foundation.

When a user seeks to register the OTP token 101 to the web service 601, the service provider server 107 responds with a request for two OTP passwords and UID of the user's OTP token 101 (see below). The obtained OTP passwords and UID are then forwarded to the manufacturer backend server 109 to verify the OTP passwords as corresponding to the token having the UID and, if such is the case, to obtain the symmetric key corresponding to the token and to store the symmetric key in the Symmetric Key table 415. Accordingly, the program area contains a program (or programs) 605 for causing the processor to cause the service provider server 107 to perform these functions.

One mechanism for causing the user to be prompted on the end-user's computer 103 to enter the OTP passwords and OTP token UID 205 is to transmit a script or web page 607 stored in the program area 413 to the end-user's computer 103 where the script or web page 607 may be executed on a web browser executing on the end-user's computer 103.

Figure 7:
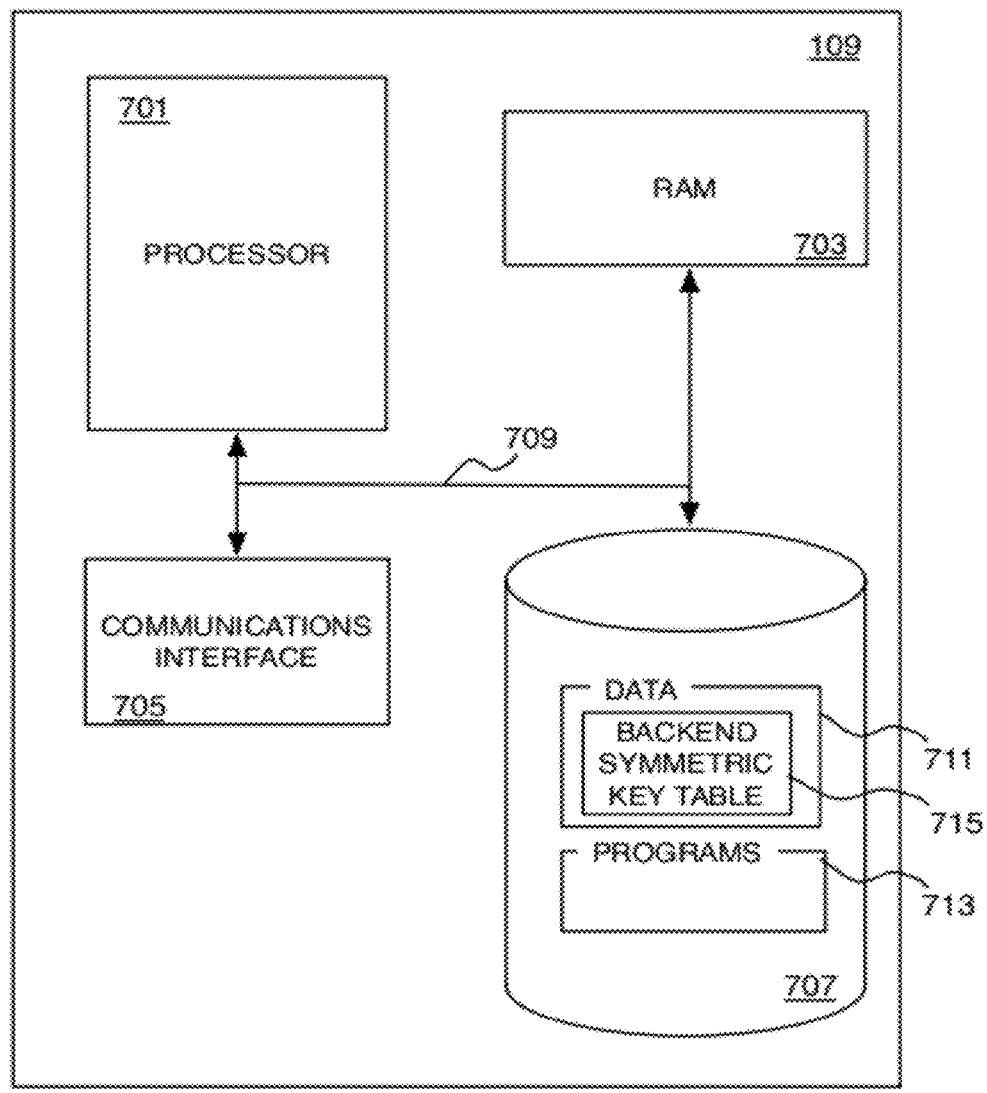
FIG. 7 is a block diagram illustrating a high-level view of an example architecture of a backend server, e.g., operated by a manufacturer of OTP tokens.

FIG. 7 is a block diagram illustrating a high-level view of an example architecture of a backend server, e.g., operated by a manufacturer of OTP tokens. The manufacturer backend server 109 typically is a server computer capable of providing services over a network 105. As such, it has a similar structure to the web server 107. It typically contains a processor 701, RAM 703 for storing temporary data, a communications interface 705 for communications over the network 105, and a secondary storage unit 707 for storing data 711 and programs 713 including programs for providing instructions to the processor to perform the functions of the manufacturer backend server 109 described herein. The data area 711 includes a Backend Symmetric Key table 715.

FIG. 8 is an illustration of the Symmetric Key table 715 held by the manufacturer backend server 109 to link unique identifiers for OTP tokens produced by the backend, their corresponding key values, service providers to which the OTP tokens are linked, and whether such service providers operate in a federated mode. The Backend Symmetric Key table 715 includes fields for storing the unique identifier (UID) for each OTP token it has provided, the symmetric key (SYM KEY) for each such token, the service provider that has registered the token (SERVICE PROVIDER), whether the token has been registered (REG) and whether the token is federated (FED). Federation of a token—i.e., the mechanism to use a token for authentication to several independent web services by authentication via one web service provider—is an alternative embodiment described in greater detail below. Thus, the FED field is optional and not used in embodiments that do not provide for federation of tokens. Furthermore, the identity of the service provider is not necessary for tokens that are not federated. Therefore, the SERVICE PROVIDER field may also be optional, but may be useful for other purposes.

Thus, the UID and SYM KEY fields are assigned by the manufacturer when the token is manufactured and stored in the manufacturer backend server 109 at that time or at a time prior to release of the token into a distribution channel. The REG field is initially set to NO, i.e., the token has not been registered, and the FED field value is undefined ("-") until the token is registered. The SERVICE PROVIDER field is set when a service provider registers a token with the backend. At that time, the backend will know the identity of the service provider to which the token is registered. As part of the registration process, the service provider indicates to the manufacturer backend server 109 whether the token may be used for federated authentication and the manufacturer backend server 109 sets the FED field accordingly. It should be noted that federated authentication is an enhancement to the key distribution mechanism described herein. Thus, the FED field is optional and would not be used in embodiments in which federated authentication is not provided.

In the federated authentication embodiment, the manufacturer backend server 109 stores contact information for the service provider that provides authentication. That contact information may, for example, be stored in a separate Service Provider table. FIG. 9 is an illustration of the Service Provider table 901 held by the manufacturer backend server 109 to link the service provider key in the Backend Symmetric Key table 715 to contact information of the registering service provider, e.g., the url of the web service used to register the OTP token 101.

Figure 10:
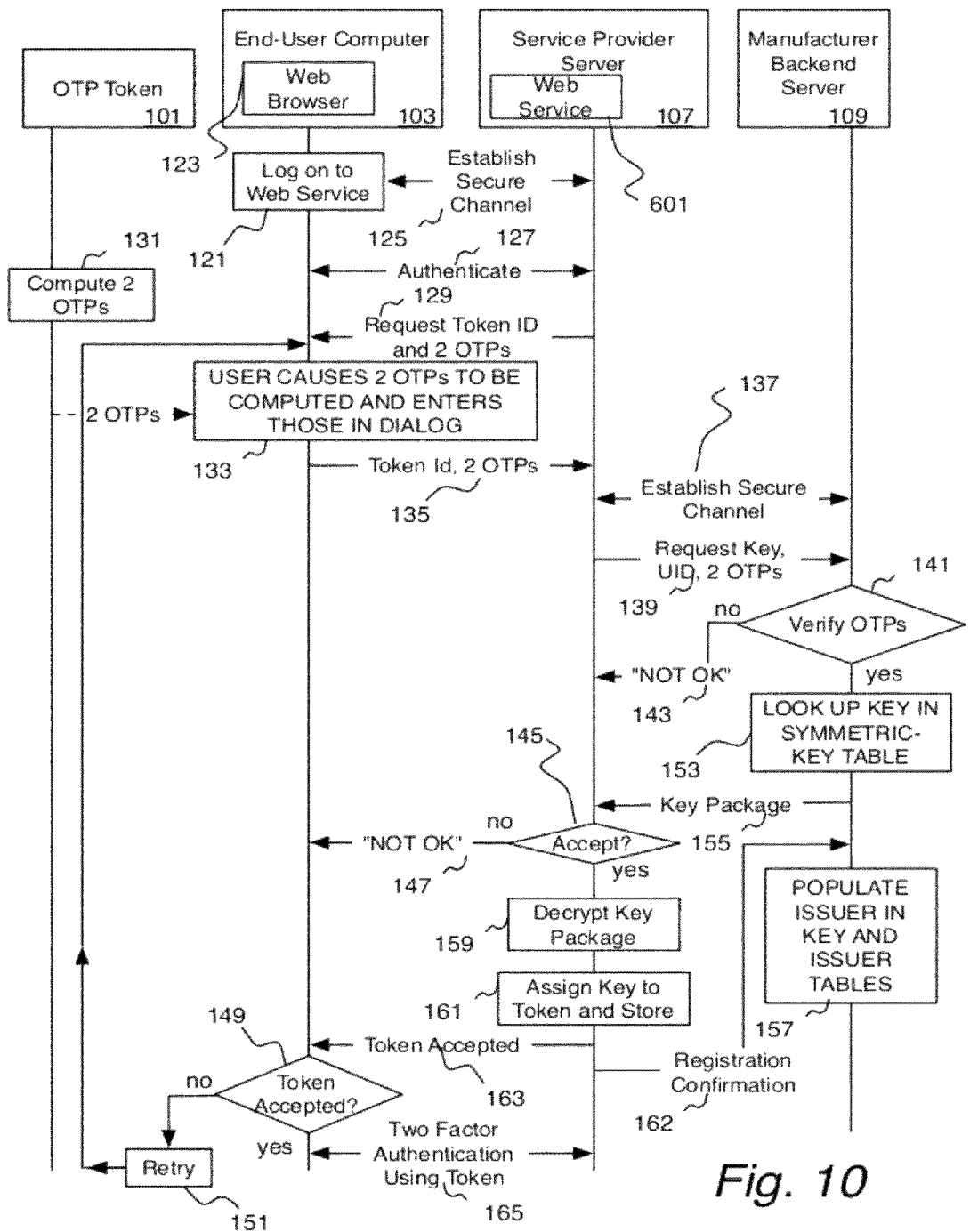
FIG. 10 is a timing sequence diagram illustrating the message flow between the OTP token, the end-user computer, the service provider server, and the manufacturer backend server to securely register the key value of the OTP token with the service provider.

Turning now to the registration process. FIG. 10 is a timing sequence diagram illustrating the message flow between the OTP token 101, the end-user computer 103, the service provider server 107, and the manufacturer backend server 109 to securely register the key value of the OTP token with the service provider. The communication between end-user's computer 103, the service provider server 107, and the manufacturer backend server 109 is typically over a network 105 such as the Internet.

Preliminarily, the user obtains an OTP token 101 through a distribution channel. One advantage of the mechanisms described herein is that they facilitate the registration of OTP tokens that are obtained via distribution channels that have not traditionally been used for distribution of OTP tokens, e.g., retail stores. Therefore, for the purposes of providing an example, the user may obtain the OTP token 101 from a retailer, e.g., Wal-Mart or Best Buy in the United States or Carrefour in Europe.

To use the OTP token 101 to authenticate to a web service, the user logs onto a web service that accepts OTP tokens for authentication, step 121, using a web browser 123. For the purpose of providing an example, this web service might be "ABC Bank" A secure channel is established, e.g., using the https protocol, between the web browser 123 and the web service 601 executing on the service provider server 107, step 125. The web service 601 asks the user to authenticate using some established mechanism, e.g., username and password or a secure email sent to the user's established email address, step 127.

Once the user has authenticated with the web service 601 and indicated that the user wishes to register an OTP token 101 for use with the web service 601, the web service 601 requests the unique ID (UID) of the OTP token 101 and two one-time passwords generated by the OTP token 101, step 129. In response, the user operates the OTP token 101 to generate two passwords, step 131, and enters those passwords and the token UID in a dialog box provided for that purpose by the web service 601 on the web browser 123, step 133. Since the OTP token 101 is a non-connected token there is no connection between the end-user's computer 103 and the OTP token 101. Therefore, the UID and OTPs are entered manually by the user. The token ID and the two passwords are transmitted from the end-user's computer 103 to the service provider server 107, step 135.

Having received the UID and OTPs from the end-user's computer 103, the service provider server 107 operates to obtain the symmetric key for the OTP token 101 from the manufacturer backend server 109. First, the service provider server 107 establishes a secure channel with the manufacturer backend server 109, step 137. Over that secure channel, the service provider server 107 requests the symmetric key and transmits the UID and the two OTPs received from the end-user's computer 103 to the manufacturer backend server 109, step 139.

Upon receiving the request for the symmetric key of the OTP token 101, the manufacturer backend server 109 verifies that the two passwords correspond to two passwords that would be obtained from the OTP token 101 having the unique ID provided by the service provider server 107, step 141. The two passwords would be verified as acceptable if they are within a sequence of passwords that the manufacturer backend server 109 considers to be reasonable. For example, if the OTPs are calculated using a counter, the manufacturer backend server 109 may accept the OTPs if they are sequential and within the first 50 passwords expected from the OTP token 101. If the OTPs are calculated using time, e.g., the current UNIX time, there should not be a need for accepting OTPs within an acceptable range of time as both the OTP token 101 and the manufacturer backend server 109 should be able to have an accurate measure for time other than to allow some drift for the OTP token clock. To allow for OTP token clock drift, one or two OTPs before and after the OTP corresponding to the current UNIX time may be allowed as acceptable.

In an alternative embodiment, the manufacturer backend server 109 further maintains a list of registered service providers. Unless the manufacturer backend server 109 can verify that the service provider server 107 corresponds to such a pre-registered service provider, the manufacturer backend server 109 rejects the request for a key for the OTP token 101.

If the manufacturer backend server 109 determines that there is not a match between the two passwords and the UID, the manufacturer backend server 109 transmits a "NOT OK" message 143 to the service provider server 107 which when analyzing the received message, step 145, determines that a "NOT OK" message was received, transmits a "NOT OK" to the end-user's computer 103, message 147. The web page running on the end-user's computer 103 may then detect the "NOT OK" message 147, step 149, and display a dialog inviting the user to retry the registration of the token, step 151.

On the other hand, if the manufacturer backend server 109 determines that there is a match between the UID and the proffered OTPs, step 141, the manufacturer backend server 109 retrieves the symmetric key from the Backend Symmetric Key table 715, step 153. The symmetric key is transmitted to the service provider server 107, step 155, for example, as an OATH key package according the OATH standard from Initiative for Open Authentication.

Having received the key package 155 from the manufacturer backend server 109, rather than a "NOT OK" message, step 145, the service provider server 107 decrypts the key package, step 159, and assigns the received key to the OTP token 101 and stores the symmetric key in the Symmetric Key table 415 as being assigned to the OTP token 101, step 161.

Having obtained the key from the manufacturer backend server 109, the service provider server 107 then transmits a "Token Accepted" message to the end-user's computer 103, step 163, where a message may be displayed to the user on the web browser 123 confirming the registration of the OTP token 101. Henceforth, the user may use the OTP token 101 for two-factor authentication with the web service 601, step 165.

The service provider server 107 transmits a registration confirmation back to the manufacturer backend server 109, step 162. And, finally, in response to receiving the registration confirmation message, the manufacturer backend server 109 stores the information from the service provider server 107 in the Backend Symmetric Key table 715, step 157.

FIGS. 11, 12, and 13 are populated database tables for the Symmetric Key table 415 at the service provider server, the Backend Symmetric Key table 715 at the manufacturer backend server 109, and the Service Provider table at the manufacturer backend server 109, respectively, after issuance of several OTP tokens through the process of FIG. 10 and some period of use. Consider as an example that the Symmetric Key table 415 of FIG. 11 illustrates the Symmetric Key table 415' of service provider ABC Bank. It has registered OTP tokens 101 for four users: Claire, Liam, Jane Doe, and Julius Doe.

These are from three different manufacturers with manufacturer codes GA, HC, and IF, respectively. Claire's token has the UID GAKT0000031F indicating that it corresponds to manufacturer GA. The service provider server 107 has a mechanism, e.g., web lookup, for determining the URLs of the manufacturer backend servers for each manufacturer.

Now, consider the Backend Symmetric Key table 715' corresponding to manufacturer GA illustrated in FIG. 12. The manufacturer GA has four entries in its Backend Symmetric Key table 715', including Claire's token GAKT0000031F. Claire's card is federated, meaning that ABC Bank is prepared to provide authentication services on behalf of other web services.

Furthermore, the contact information, in this example the URL, is entered into the Service Provider table 109'.

Figure 14:
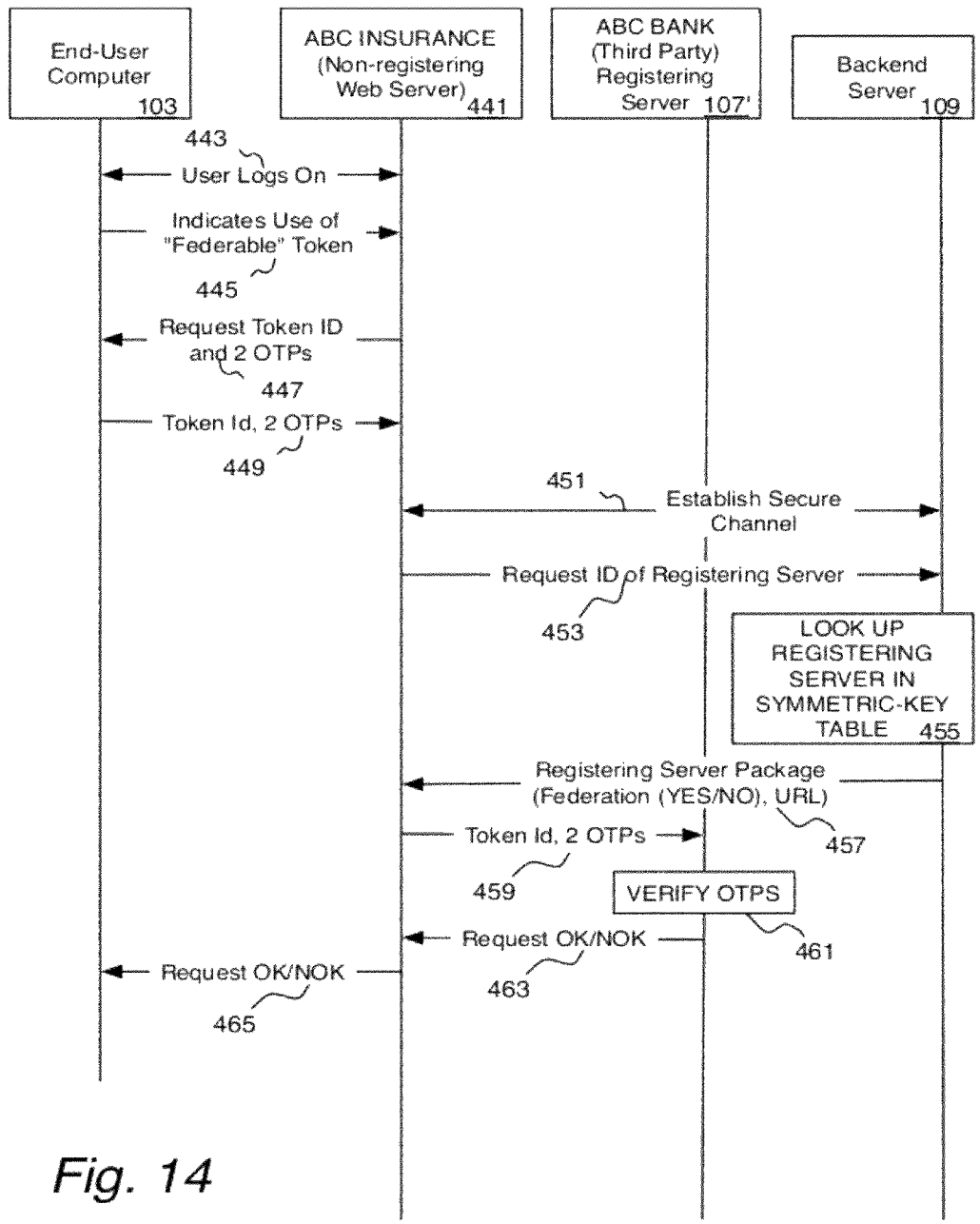
FIG. 14 is a timing sequence diagram illustrating the message flow between the end-user computer, a Web server other than the service provider server, the service provider server, and the manufacturer backend server to securely verify the OTP generated by the OTP token (not shown) used by the end user at the end-user computer by the service provider server thereby providing federated two-factor authentication using the OTP token.

FIG. 14 is a timing sequence diagram illustrating the message flow between the end-user computer 103, a Web Server 441 which is not the service provider that registered the OTP token 101 the end-user wishes to use for authentication, the service provider server 107' that provides federated authentication services, i.e., the service provider that registered the token, and the manufacturer backend server 109 to securely verify the OTP generated by the OTP token (not shown) used by the end user at the end-user computer 101 by the registering service provider server 107 thereby providing federated two-factor authentication using the OTP token 101.

A user logs on to a web service provided on the non-registering web server 441, step 443, and indicates the use of a "federable" OTP token for authentication, step 445. The non-registering web server 441, in this example ABC Insurance, responds with a request for the UID of the OTP token 101 and two passwords generated by the OTP token 101, step 447, and the end-user's computer 103 responds accordingly, step 449. The above mechanism may be effectuated by transmitting a web page or script from the non-registering web server 441 to the end-user's computer 103 to cause a browser thereon to display an appropriate dialog user interface for obtaining the token UID and the OTPs.

Having received the UID and two passwords from the non-registering web server 441 determines which backend server registered the OTP token 101, for example, by web lookup using the manufacturer code in the UID, and establishes a secure channel to that backend server 109, step 451, then requests the registering service provider server 107—i.e., which service provider server 107 was used to register the OTP token 101 that the user wishes to use for authentication—from the manufacturer backend server 109, step 453.

Having received the request for the registering service provider from the non-registering web server 441—i.e., the web server that the user is attempting to use the OTP token 101 for authentication—the manufacturer backend server 109 performs a table lookup on the Backend Symmetric Key table 715 and the Service Provider table 901 to determine which service provider was used to register the OTP token 101 and the url for that service provider server 107', step 455, and the manufacturer backend server 109 responds to the request with a message containing the identity of the registering service provider, contact information for the service provider (e.g., url), and whether the OTP token 101 is federated or not, step 457. Alternatively, if the OTP token 101 is not federated, the response message may simply be a message to that effect.

If the OTP token 101 is federated, the non-registering web server 441 transmits the token UID and the two OTPs received from the end-user's computer 103 to the registering service provider 107' identified in the response message from the manufacturer backend server 109, step 459.

The registering service provider server 107' verifies the two OTPs using the symmetric key for the OTP token 101, step 461, and returns a message indicating whether the OTPs provided conform with the UID provided to the non-registering web server 441, step 463. The non-registering web server 441 then transmits a message to the end user's computer 103 indicating whether the authentication passed based on the UID and two passwords, step 465. If the authentication passed, the user is granted access to the web service on the non-registering web server 441, and if the authentication did not pass, the web service may invite the user to make another attempt or take some other corrective action.

The above discussion describes authentication based on one-time passwords and, in particular, the registration of a one-time password token obtained through a channel that does not directly involve the entity with which the one-time password token is to be used. The mechanisms discussed rely on calculation of one-time passwords so that these passwords may be presented to the registering service provider and to the backend service for verification. Both the OTP token 101, the registering service provider server 107 and the manufacturer backend server 109 calculate OTPs. The above described mechanisms are applicable to both known and future algorithms for calculating OTPs that rely on a symmetric key being known to both an OTP token 101 and a server that verifies passwords provided by an OTP token 101.

While in the above description authentication of an OTP token 101 is generally made using two one-time passwords calculated in sequence, the mechanisms may be adapted to require only one one-time password. While two one-time passwords provide a stronger authentication requirement, the herein described techniques apply equally well to a requirement for authentication with solely one password.

Figure 15:
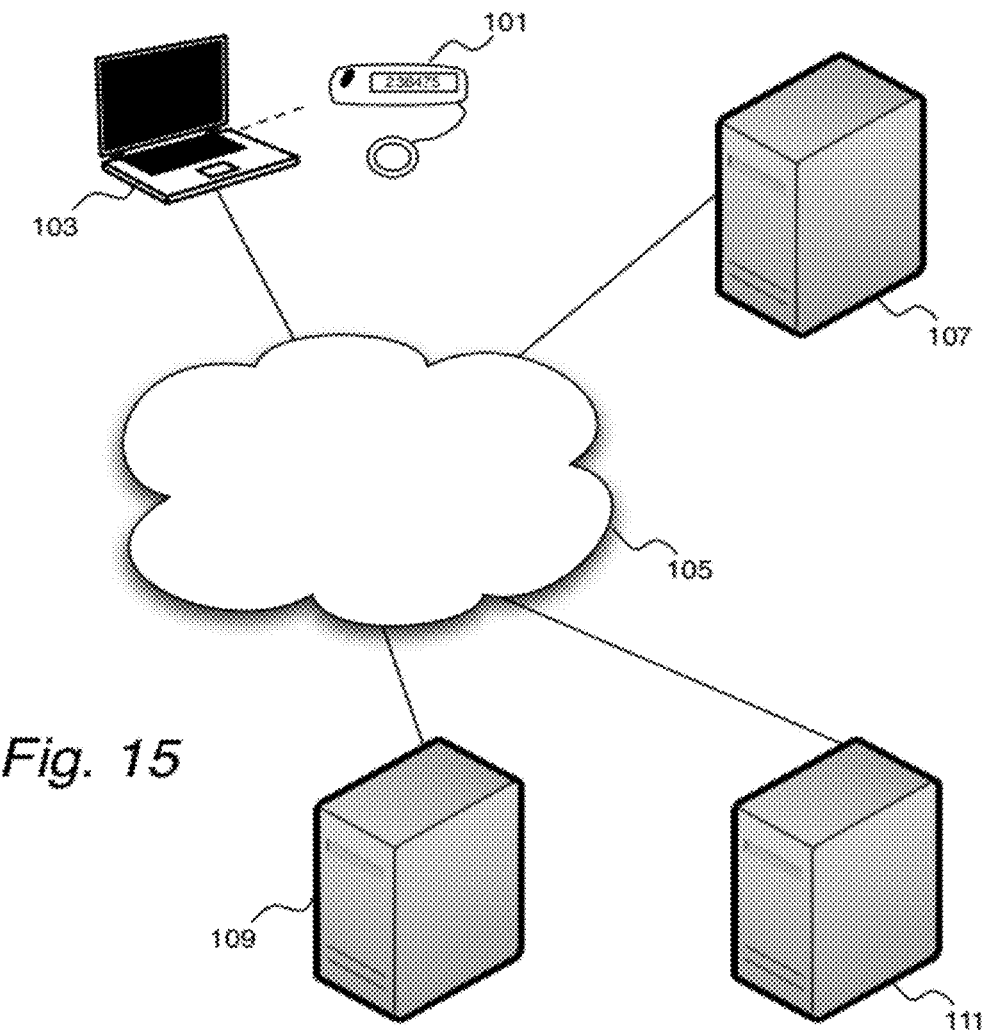
FIG. 15 is a block diagram illustrating an alternative network in which an unconnected one-time password token may be deployed by a service provider that is not directly associated with the manufacturer of the token as in FIG. 1 and in which a federated services provider server provides federated authentication.

FIG. 15 is a block diagram illustrating an alternative network in which an unconnected one-time password token may be deployed by a service provider that is not directly associated with the manufacturer of the token as in FIG. 1 and in which a federated services provider server 111 provides federated authentication. In this alternative embodiment, the registering server 107' delegates federation to the federated services provider server 111.

FIG. 16 provides example database schema with alterations to the database schema described hereinabove wherein the alterations provide a mechanism in which the federated services provider server 111 may act as a hub handling federation services on behalf of a service provider.

The Backend-Symmetric-Key table 715, in hub federation embodiment, includes a FED SERV field indicating the url for the server that handles the federation services. In the example given, the Backend-Symmetric-Key table 715" contains references to four OTP tokens 101, two issued by ABC Bank and two by GREYSTONE Corp. Whereas GREYSTONE Corp. provides its own federated services, ABC Bank has delegated federated services to a third party fedserv1.com.

The federated services provider server 111 contains a data storage device containing a Symmetric Key Table (Federation Services Provider) 415". The Symmetric-Key table 415" contains the SYM KEY field holding the Symmetric Key for each OTP token 101 for which it provides one-time passwords.

For the embodiment with a federation services handled by a hub, i.e., the federation services provider server 111, the dataflow of FIG. 10 is essentially unchanged. One difference is that the population of issuer in Key and Issuer tables, step 157, includes populating the Symmetric-Key table (Backend)

715" with the Federation Server url for cards that federated services are provided and the Symmetric-Key table (Federation Services Provider) 415".

For the embodiment with a federation services handled by a hub, i.e., the federation services provider server 111, the dataflow is essentially unchanged from the flow illustrated in FIG. 14. In step 455, rather than the manufacturer backend server 109 retrieving the url of the server 107 that registered the OTP token 101, the manufacturer backend server 109 retrieves the url of the server 111 that provides federation services for the OTP token 101.

The above discussion describes authentication based on one-time passwords and, in particular, the registration of a one-time password token obtained through a channel that does not directly involve the entity with which the one-time password token is to be used. The mechanisms discussed rely on calculation of one-time passwords so that these passwords may be presented to the registering service provider and to the backend service for verification. Both the OTP token 101, the registering service provider server 107 and the manufacturer backend server 109 calculate OTPs. The above described mechanisms are applicable to both known and future algorithms for calculating OTPs that rely on a symmetric key being known to both an OTP token 101 and a server that verifies passwords provided by an OTP token 101.

While in the above description authentication of an OTP token 101 is generally made using two one-time passwords calculated in sequence, the mechanisms may be adapted to require only one one-time password. While two one-time passwords provide a stronger authentication requirement, the herein described techniques apply equally well to a requirement for authentication with solely one password.

From the foregoing it will be apparent that a technology is provided that permits registration of an OTP token that has not been obtained directly from the service with which the OTP token is to be used for authentication. The technology provides a flexible, robust and secure mechanism for distributing symmetric keys used in calculating OTPs on the verifying server. The described technology provides for symmetric key distribution on an individual token basis which therefore does not require lists of symmetric keys to be distributed or holding inventories of tokens dedicated to particular services. Therefore, thanks to the described technology it is possible to distribute OTP tokens via channels such as retail stores and OTP tokens may be commoditized.

Although specific embodiments of the invention have been described and illustrated, the invention is not to be limited to the specific forms or arrangements of parts so described and illustrated. The invention is limited only by the claims.

We claim:

1. A method for distributing a symmetric key for a one-time password token, having a unique identifier, in a system including an end-user computer operated by an end-user, a service provider server of a service provider having a service provider identifier, and a manufacturer backend server operated by the manufacturer of the OTP token, the method operating to distribute the symmetric key from the manufacturer backend server to the service provider server and comprising:

operating the end-user computer and service provider server to authenticate the end-user with the service provider;

transmitting a message containing the token unique identifier and a token possession confirmation from the end-user computer to the service provider server;

in response to receiving the response with the token unique identifier and the token possession confirmation, transmitting an authentication message having the service provider identifier, the token unique identifier, and the token possession confirmation from the service provider server to the manufacturer backend server;

in response to receiving the authentication message, operating the manufacturer backend server to independently verify the token possession confirmation as belonging to a token corresponding to the token unique identifier and upon successful verification, transmitting a symmetric key corresponding to the token corresponding to the token unique identifier from the manufacturer backend server to the service provider server; and in response to receiving the symmetric key, operating the service provider to securely store the token key and associate the token unique identifier and the symmetric key received from the manufacturer backend server.

2. The method of claim 1 for distributing a symmetric key for a one-time password token, further comprising:

operating the end-user computer to transmit a user request to use the one-time password token for authentication from the end-user computer to the service provider server; and in response to receiving the request to use the one-time password token for authentication, transmitting a request for the token unique identifier and for a confirmation of possession of the OTP token from the service provider server to the end-user computer; and wherein the transmission of a message containing the token unique identifier and token possession confirmation is transmitted in response to a message transmitted from the service provider server requesting the token unique identifier and the token possession confirmation.

3. The method of claim 1 for distributing a symmetric key for a one-time password token, further comprising:

transmitting a registration confirmation from the service provider server to the manufacturer backend server; and in response to receiving the registration confirmation, operating the manufacturer backend server to set a token registered status for the OTP token as registered.

4. The method of claim 1 for distributing a symmetric key for a one-time password token wherein the token possession confirmation is at least one one-time password calculated by said one time password token.

5. The method of claim 1 for distributing a symmetric key for a one-time password token wherein the token possession confirmation is produced by causing the OTP token to generate at least one one-time passwords and wherein the manufacturer backend server uses the symmetric key value associated with the token unique identifier to independently generate at least one one-time passwords and comparing the one-time passwords generated by the OTP token to the independently generated one-time passwords.

6. The method of claim 5 for distributing a symmetric key for a one-time password token wherein the at least two one-time passwords generated by the manufacturer backend server are a sequence of one-time passwords which must contain the one-time passwords generated by the OTP token to cause the manufacturer backend server to accept the one-time passwords generated by the OTP token as evidence that the user is in possession of the OTP token bearing the token unique identifier transmitted from the end-user computer.

7. A method for authenticating an end-user to a second party, wherein the end-user operates an end-user computer to access a resource of a second party server operated by the second party, using a third-party issued One-Time Password (OTP) token having a unique identifier and associated with a backend server, the method comprising:

operating the second party server to request the end-user computer to return the unique identifier and two one-time passwords generated by the OTP token;
operating the end-user computer to return the unique identifier and two one-time passwords generated by the OTP token;
operating the second party server to request the manufacturer backend server associated with the OTP token to return contact information corresponding to the third party that registered the OTP token having the unique identifier;
operating the manufacturer backend server to return the contact information for the third party to the second party server; and
operating the second party server to use the contact information for the third party to request a third party server operated by the third party to return a verification of the OTP passwords generated by the OTP token.

8. The method for authenticating an end-user to a second party of claim 7 further comprising:
allowing the third party to indicate to the manufacturer backend server whether the OTP token may be used to authenticate the user with services other than the services provided by the third party;
operating the manufacturer backend server to verify that the OTP token may be used to authenticate the user with services other than the services provided by the third party and only returning the contact information of the third party if the OTP token may be used to authenticate the user with services other than the services provided by the third party.

9. The method of claim 7, further comprising:
operating the manufacturer backend server to verify the OTP token by comparing the two generated OTP passwords against OTP passwords generated independently by the manufacturer backend server.

10. The Method of claim 7 where the proof of possession of the token by the end user consist of at least one OTP value generated by the end user that is compared by the third party with OTP values generated for a time interval or event interval using the symmetric key corresponding to the OTP token UID.

11. The method of claim 1 further comprising operating the manufacturer backend server to verify the service provider as being a pre-registered service provider before providing a symmetric key corresponding to the token.

12. The method of claim 7 where the third party is a third party hub operating as a registry to which a service provider may delegate verification of one-time passwords.

13. A manufacturer backend server for distributing one-time password keys to a server verifying one-time passwords produced by one-time password tokens having token ids, the manufacturer backend server comprising
a processor and storage means,
the storage means including:
a datastore storing one-time password token keys corresponding to one-time password ids;
instructions to cause the manufacturer backend server processor to:
receive a token authentication and registration request message from a service provider server, wherein the token authentication message contains a token id and at least one one-time password purported to have been generated by the one-time token corresponding to the token id;
retrieve the token key corresponding to the at least one one-time password purported to have been generated by the one-time password token corresponding to the received token id;
using the retrieved token key to verify that the one-time password purported to have been generated by the one-time password token corresponding to the received token id corresponds to the token associated with the received token id;
upon verifying that the one-time password purported to have been generated by the one-time password token corresponding to the received token id corresponds to the token associated with the received token id, transmitting the token key to an authentication server.

14. The manufacturer backend server for distributing one-time password keys of claim 13 further comprising instructions to cause the manufacturer backend server to transmit a registration confirmation to the authentication server and to set a token registered status for the OTP token as registered.

15. The manufacturer backend server for distributing one-time password keys of claim 13 wherein the service provider server and the authentication server are the same server.

16. The manufacturer backend server for distributing one-time password keys of claim 13 wherein the authentication server is a hub acting to provide federated one-time password verification on behalf of service provider servers.

17. A system for distributing one-time passwords keys for one-time password tokens, comprising:
a service provider server operable to:
receive a message containing a token unique identifier associated with a one-time password token and a token possession confirmation from an end-user computer; and
upon receipt of a message containing a token unique identifier associated with a one-time password token and a token possession confirmation from an end-user computer, transmitting an authentication message having the service provider identifier, the token unique identifier, and the token possession confirmation from the service provider server to the manufacturer backend server; and
a manufacturer backend server operable to:
to independently verify the token possession confirmation as belonging to a token corresponding to the token unique identifier and upon successful verification, transmitting a symmetric key corresponding to the token corresponding to the token unique identifier from the manufacturer backend server to an authentication service provider server; and
an authentication service provider server operable to
receive the symmetric key from the manufacturer backend server; and
upon receiving the symmetric key, to securely store the token key and associate the token unique identifier and the symmetric key received from the manufacturer backend server.

18. The system for distributing one-time passwords keys for one-time password tokens of claim 17 wherein the service provider server is further operable to:
in response to receiving the request to use the one-time password token for authentication, transmit a request for the token unique identifier and for a confirmation of possession of the OTP token from the service provider server to the end-user computer; and
wherein the transmission of a message containing the token unique identifier and token possession confirmation is transmitted in response to a message transmitted from the service provider server requesting the token unique identifier and the token possession confirmation.

19. The system for distributing one-time passwords keys for one-time password tokens of claim 17 wherein the service provider server is further operable to transmit a registration confirmation from the service provider server to the manufacturer backend server; and wherein the manufacturer backend server is further operable to, in response to receiving the registration confirmation, to set a token registered status for the OTP token as registered.

20. The system for distributing one-time passwords keys for one-time password tokens of claim 17 wherein the token possession confirmation is at least one one-time password calculated by said one time password token.

21. The system for distributing one-time passwords keys for one-time password tokens of claim 20 wherein the manufacturer backend server is further operable to use the symmetric key value associated with the token unique identifier to independently generate at least one one-time passwords and comparing the one-time password generated by the OTP token to the independently generated one-time passwords.

22. The system for distributing one-time passwords keys for one-time password tokens of claim 17 wherein the service provider server and the authentication service provider are the same server.

23. The system for distributing one-time passwords keys for one-time password tokens of claim 17 wherein the authentication service provider is a server dedicated to provide federated authentication services on behalf of the service provider server.

* * * * *